(12) United States Patent
Dacosta

(10) Patent No.: US 6,491,594 B1
(45) Date of Patent: Dec. 10, 2002

(54) DIVOT REPAIR TOOL HOLDING DEVICE

(76) Inventor: Patrick Dacosta, 11 Secora Rd. Unit A-1, Monsey, NY (US) 10952

( * ) Notice: Subject to any disclaimer, the term of this patent is extended or adjusted under 35 U.S.C. 154(b) by 0 days.

(21) Appl. No.: 09/939,033

(22) Filed: Aug. 24, 2001

(51) Int. Cl.[7] ............................................. A63B 57/00
(52) U.S. Cl. ..................................................... 473/408
(58) Field of Search ................................. 473/406, 408, 473/286, 285; 224/918

(56) References Cited

U.S. PATENT DOCUMENTS

| | | | |
|---|---|---|---|
| D274,830 S | 7/1984 | Lynch | |
| 4,736,877 A | 4/1988 | Clark | |
| 4,960,278 A * | 10/1990 | Hainey | 273/DIG. 21 |
| 5,054,777 A | 10/1991 | Borden et al. | |
| 5,211,395 A * | 5/1993 | Liao | 473/391 |
| 5,782,708 A | 7/1998 | Kimball | |
| 5,795,248 A | 8/1998 | Giglio | |
| 5,799,853 A | 9/1998 | Brewster | |
| 6,220,973 B1 * | 4/2001 | Hsu | 473/406 |

* cited by examiner

Primary Examiner—Steven Wong

(57) ABSTRACT

A divot repair tool holding device for securing a divot repair tool to a user for convenient use and storage. The divot repair tool holding device includes a housing having a front wall, a back wall and a peripheral wall. The front wall has an opening therein. A spindle is positioned in the housing. A spool is positioned on the spindle such that the spool is rotatable with respect to the housing. A biasing means biases rotation of the spool in a first direction. An elongated flexible member has a first end and second end. The first end is attached to the spool and wound about the spool when the spool is rotated in the first direction. The second end of the elongated flexible member extends through the opening. A divot repair tool is securely attached to the second end of the elongated flexible member.

10 Claims, 4 Drawing Sheets

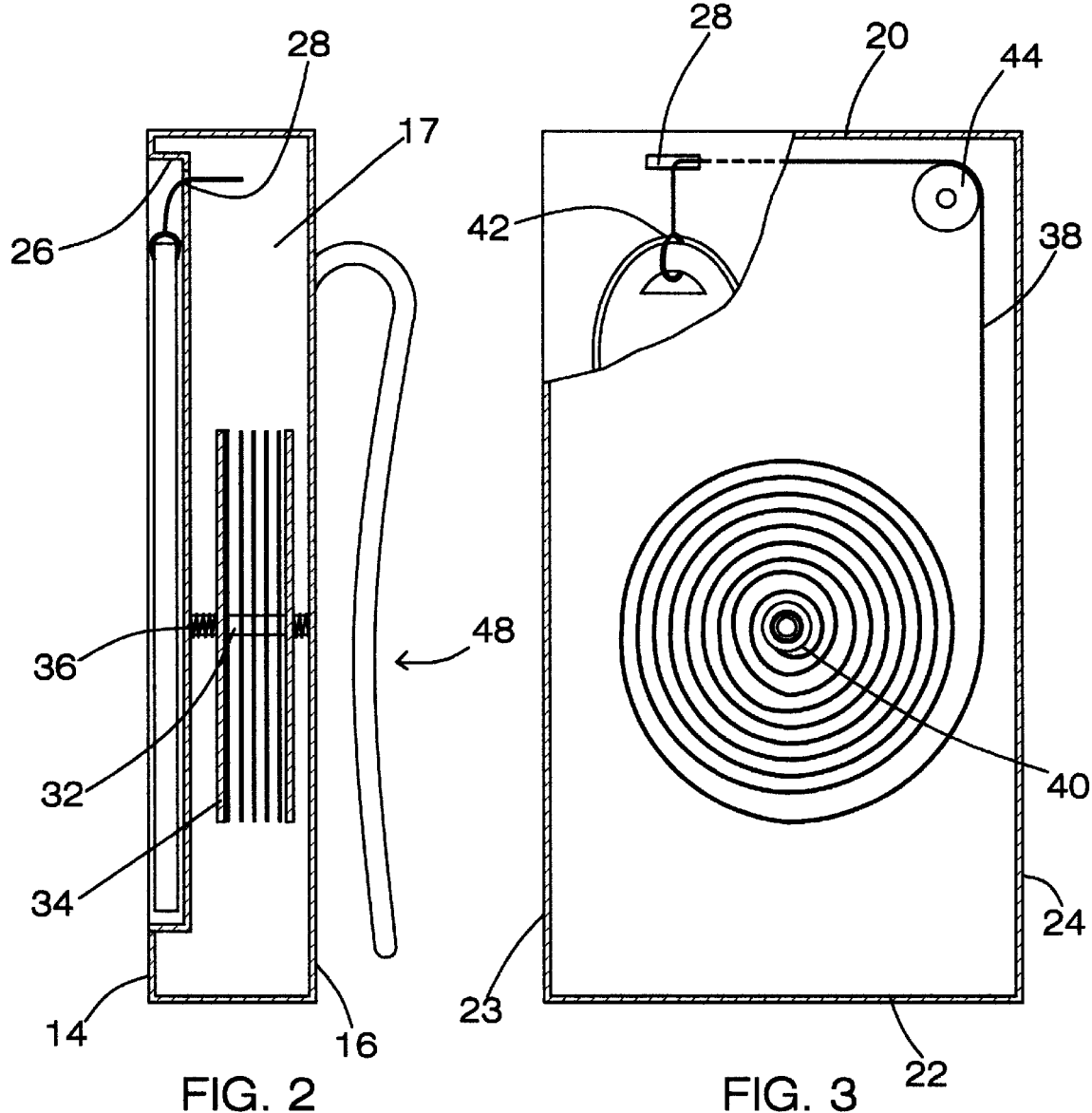

DIVOT REPAIR TOOL HOLDING DEVICE

BACKGROUND OF THE INVENTION

1. Field of the Invention

The present invention relates to tool holding devices and more particularly pertains to a new divot repair tool holding device for securing a divot repair tool to a user for convenient use and storage.

2. Description of the Prior Art

The use of tool holding devices is known in the prior art. More specifically, tool holding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,782,708; U.S. Pat. No. 4,736,877; U.S. Pat. No. 5,799,853; U.S. Pat. No. 5,054,777; U.S. Pat. No. 5,795,248; and U.S. Des. Pat. No. 274,830.

While these devices fulfill their respective, particular objectives and requirements, the aforementioned patents do not disclose a new divot repair tool holding device. The inventive device includes a housing having a front wall, a back wall and a peripheral wall extending between the front and back walls such that a chamber is defined within the housing. The front wall has an opening therein extending into the chamber. A spindle is positioned in the housing and extends between the front and back walls. A spool is positioned on the spindle such that the spool is rotatable with respect to the housing. A biasing means biases rotation of the spool in a first direction. An elongated flexible member has a first end and second end. The first end is attached to the spool and wound about the spool when the spool is rotated in the first direction. The second end of the elongated flexible member extends through the opening. A divot repair tool is securely attached to the second end of the elongated flexible member.

In these respects, the divot repair tool holding device according to the present invention substantially departs from the conventional concepts and designs of the prior art, and in so doing provides an apparatus primarily developed for the purpose of securing a divot repair tool to a user for convenient use and storage.

SUMMARY OF THE INVENTION

In view of the foregoing disadvantages inherent in the known types of tool holding devices now present in the prior art, the present invention provides a new divot repair tool holding device construction wherein the same can be utilized for securing a divot repair tool to a user for convenient use and storage.

The general purpose of the present invention, which will be described subsequently in greater detail, is to provide a new divot repair tool holding device apparatus and method which has many of the advantages of the tool holding devices mentioned heretofore and many novel features that result in a new divot repair tool holding device which is not anticipated, rendered obvious, suggested, or even implied by any of the prior art tool holding devices, either alone or in any combination thereof.

To attain this, the present invention generally comprises a housing having a front wall, a back wall and a peripheral wall extending between the front and back walls such that a chamber is defined within the housing. The front wall has an opening therein extending into the chamber. A spindle is positioned in the housing and extends between the front and back walls. A spool is positioned on the spindle such that the spool is rotatable with respect to the housing. A biasing means biases rotation of the spool in a first direction. An elongated flexible member has a first end and second end. The first end is attached to the spool and wound about the spool when the spool is rotated in the first direction. The second end of the elongated flexible member extends through the opening. A divot repair tool is securely attached to the second end of the elongated flexible member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new divot repair tool holding device apparatus and method which has many of the advantages of the tool holding devices mentioned heretofore and many novel features that result in a new divot repair tool holding device which is not anticipated, rendered obvious, suggested, or even implied by any of the prior art tool holding devices, either alone or in any combination thereof.

It is another object of the present invention to provide a new divot repair tool holding device which may be easily and efficiently manufactured and marketed.

It is a further object of the present invention to provide a new divot repair tool holding device which is of a durable and reliable construction.

An even further object of the present invention is to provide a new divot repair tool holding device which is susceptible of a low cost of manufacture with regard to both materials and labor, and which accordingly is then susceptible of low prices of sale to the consuming public, thereby making such divot repair tool holding device economically available to the buying public.

Still yet another object of the present invention is to provide a new divot repair tool holding device which provides in the apparatuses and methods of the prior art some of the advantages thereof, while simultaneously overcoming some of the disadvantages normally associated therewith.

Still another object of the present invention is to provide a new divot repair tool holding device for securing a divot repair tool to a user for convenient use and storage.

Yet another object of the present invention is to provide a new divot repair tool holding device which includes a housing having a front wall, a back wall and a peripheral wall extending between the front and back walls such that a chamber is defined within the housing. The front wall has an opening therein extending into the chamber. A spindle is positioned in the housing and extends between the front and back walls. A spool is positioned on the spindle such that the spool is rotatable with respect to the housing. A biasing means biases rotation of the spool in a first direction. An elongated flexible member has a first end and second end. The first end is attached to the spool and wound about the spool when the spool is rotated in the first direction. The second end of the elongated flexible member extends through the opening. A divot repair tool is securely attached to the second end of the elongated flexible member.

Still yet another object of the present invention is to provide a new divot repair tool holding device that allows a user to attach the divot repair tool to their clothing so that the tool is not lost.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic cross-sectional side view taken along line 2—2 of FIG. 1 of the present invention.

FIG. 3 is a schematic cross-sectional front view of the present invention.

DESCRIPTION OF THE PREFERRED EMBODIMENT

Figure 1:
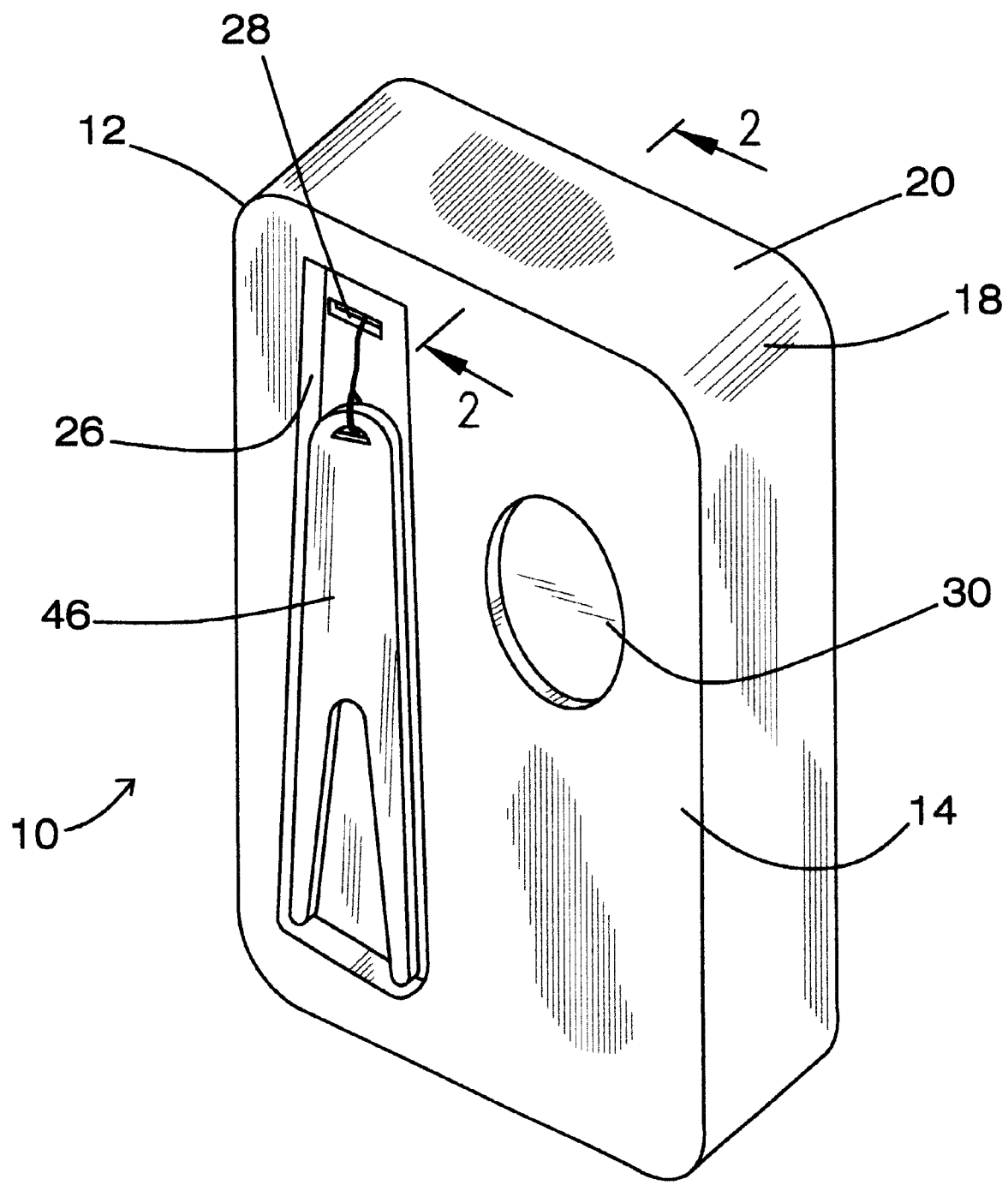
FIG. 1 is a schematic perspective view of a new divot repair tool holding device according to the present invention.

With reference now to the drawings, and in particular to FIGS. 1 through 5 thereof, a new divot repair tool holding device embodying the principles and concepts of the present invention and generally designated by the reference numeral 10 will be described.

As best illustrated in FIGS. 1 through 5, the divot repair tool holding device 10 generally comprises a housing 12 having a front wall 14, a back wall 16 and a peripheral wall 18 extending between the front 14 and back 16 walls such that a chamber 17 is defined within the housing 12. The front 14 and back 16 walls each has a generally rectangular shape such that the peripheral wall 18 includes a top wall 20, a bottom wall 22, a first side wall 23 and second side wall 24. The front wall 14 has an elongate indentation 26 therein generally extending between the top 20 and bottom 22 walls. The indentation 26 is positioned nearer the first side wall 23 than the second side wall 24. The front wall 14 has an opening 28 therein extending into the chamber 17 and positioned in the indentation 26. The opening 28 is positioned nearer the top wall 20 than the bottom wall 22. The front wall 14 has a circular depression therein 30. The depression 30 has the size and shape of a conventional ball marker which may be removably stored in the depression. A spindle 32 is positioned in the housing and extends between the front 14 and back 16 walls.

A spool 34 is positioned on the spindle 32 such that the spool 34 is rotatable with respect to the housing 12. A biasing means 36 biases rotation of the spool 34 in a first direction. The biasing means 36 preferably comprises a spring wound about the spindle 32 and is attached to and extends between the spool 34 and the front wall 14.

An elongated flexible member 38 has a first end 40 and second end 42. The first end 40 is attached to the spool 34 and wound about the spool 34 when the spool 34 is rotated in the first direction. The second end 42 of the elongated flexible member 38 extends through the opening 28. The elongated flexible member 38 comprises a cord. A pulley 44 may be used to facilitate movement of the cord through the opening 28.

A conventional divot repair tool 46 is securely attached to the second end 42 of the elongated flexible member 38. The divot repair tool 46 is removably positionable in the indentation 26.

A clip 48 is attached to the back wall 16 and comprises an elongated member 50 having a first end 52 and a second end 54. The elongate member 50 has a semi-circular arc 56 therein positioned generally adjacent to the first end 52. The first end 52 is attached to the back wall 16 and positioned nearer the top wall 20 than the bottom wall 22 such that the second end 54 extends toward the bottom wall 22. The elongate member 50 comprises a resiliently flexible material.

Figure 4:
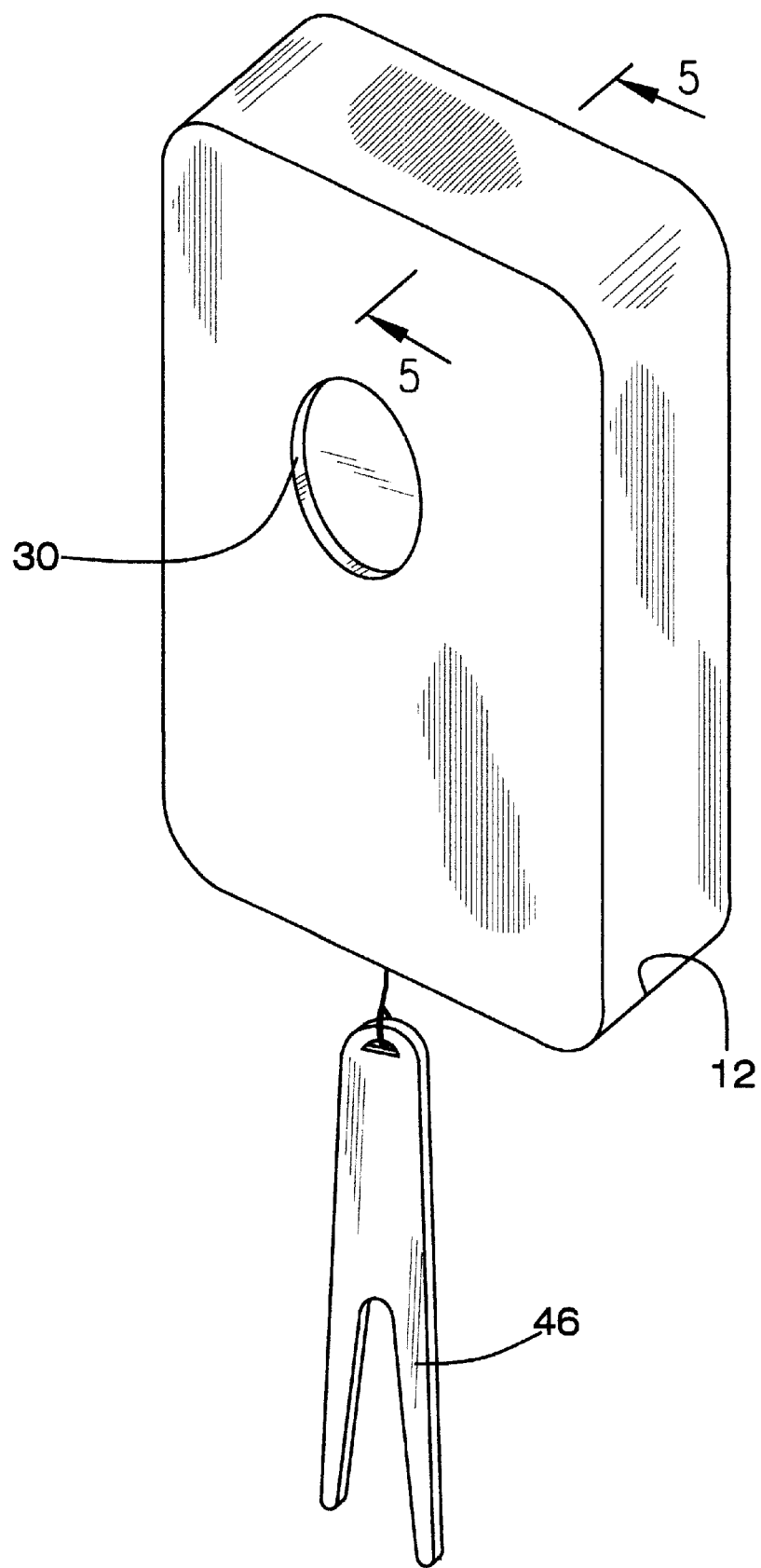
FIG. 4 is a schematic perspective view of the second embodiment of the present invention.
Figure 5:
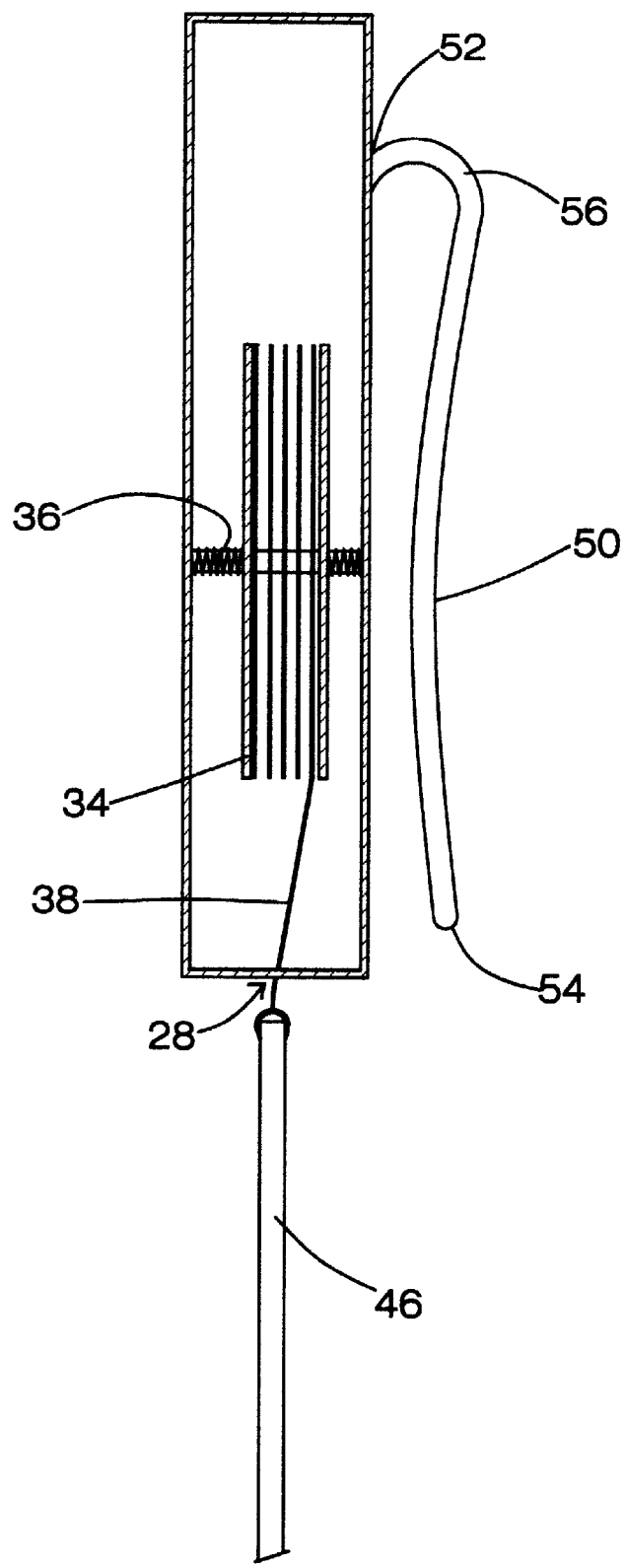
FIG. 5 is a schematic cross-sectional side view taken along line 5—5 of FIG. 4 of the present invention.

A second embodiment is shown in FIGS. 4 and 5. The second embodiment depicts the opening 28 being in the peripheral wall 18 so that the cord 38 extends through the peripheral wall 18 and the divot repair tool 46 hangs downwardly from the housing 12.

In use, the clip 48 is used to secure the device 10 to the belt or pants of the user. When the divot repair tool 46 is needed, the user pulls the tool so that the cord 38 is drawn out of the housing 12. When the user is finished, the biasing means 36 draws the cord 38 back into the housing 12 so that the user does not loose their divot repair tool 46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A divot repair tool holding device comprising:

a housing having a front wall, a back wall and a peripheral wall extending between said front and back walls such that a chamber is defined within said housing, said front and back walls each having a generally rectangular shape such that said peripheral wall includes a top wall, a bottom wall, a first side wall and a second side wall, said front wall having an opening therein extending into said chamber, said opening being positioned nearer said top wall than said bottom wall;

a spindle being positioned in said housing and extending between said front and back walls;

a spool being positioned on said spindle such that said spool is rotatable with respect to said housing, a biasing means biases rotation of said spool in a first direction;

an elongated flexible member having a first end and second end, said first end being attached to said spool and wound about said spool when said spool is rotated in said first direction, said second end of said elongated flexible member extending through said opening; and a divot repair tool being securely attached to said second end of said elongated flexible member.

2. The divot repair tool as in claim 1, wherein said front wall has an elongate indentation therein generally extending between said top and bottom walls, said indentation being positioned nearer said first side wall than said second side wall, said opening being positioned in said indentation, said divot repair tool being removably positionable in said indentation.

3. The divot repair tool as in claim 1, wherein said front wall has a circular depression therein.

4. The divot repair tool as in claim 1, wherein said biasing means comprises a spring wound about said spindle and being attached to and extending between said spool and said front wall.

5. The divot repair tool as in claim 1, further including a clip being attached to said back wall.

6. The divot repair tool as in claim 5, wherein said clip comprises an elongated member having a first end and a second end, said elongate member having a semi-circular arc therein positioned generally adjacent to said first end, said first end being attached to said back wall and positioned nearer said top wall than said bottom wall such that said second end extends toward said bottom wall, said elongate member comprising a resiliently flexible material.

7. A divot repair tool holding device comprising:

a housing having a front wall, a back wall and a peripheral wall extending between said front and back walls such that a chamber is defined within said housing, said peripheral wall having an opening therein extending into said chamber, said front wall having a circular depression therein;

a spindle being positioned in said housing and extending between said front and back walls;

a spool being positioned on said spindle such that said spool is rotatable with respect to said housing, a biasing means biases rotation of said spool in a first direction;

an elongated flexible member having a first end and second end, said first end being attached to said spool and wound about said spool when said spool is rotated in said first direction, said second end of said elongated flexible member extending through said opening;

a divot repair tool being securely attached to said second end of said elongated flexible member.

8. The divot repair tool holding device as in claim 7, further including a clip being attached to said back wall.

9. The divot repair tool as in claim 8, wherein said clip comprises an elongated member having a first end and a second end, said elongate member having a semi-circular arc therein positioned generally adjacent to said first end, said first end being attached to said back wall and positioned nearer said top wall than said bottom wall such that said second end extends toward said bottom wall, said elongate member comprising a resiliently flexible material.

10. A divot repair tool holding device comprising:

a housing having a front wall, a back wall and a peripheral wall extending between said front and back walls such that a chamber is defined within said housing, said front and back walls each having a generally rectangular shape such that said peripheral wall includes a top wall, a bottom wall, a first side wall and a second side wall, said front wall having an elongate indentation therein generally extending between said top and bottom walls, said indentation being positioned nearer said first side wall than said second side wall, said front wall having an opening therein extending into said chamber and positioned in said indentation, said opening being positioned nearer said top wall than said bottom wall, said front wall having a circular depression therein;

a spindle being positioned in said housing and extending between said front and back walls;

a spool being positioned on said spindle such that said spool is rotatable with respect to said housing, a biasing means biases rotation of said spool in a first direction, said biasing means comprising a spring wound about said spindle and being attached to and extending between said spool and said front wall;

an elongated flexible member having a first end and second end, said first end being attached to said spool and wound about said spool when said spool is rotated in said first direction, said second end of said elongated flexible member extending through said opening, said elongated flexible member comprising a cord;

a divot repair tool being securely attached to said second end of said elongated flexible member, said divot repair tool being removably positionable in said indentation; and a clip being attached to said back wall, said clip comprising an elongated member having a first end and a second end, said elongate member having a semi-circular arc therein positioned generally adjacent to said first end, said first end being attached to said back wall and positioned nearer said top wall than said bottom wall such that said second end extends toward said bottom wall, said elongate member comprising a resiliently flexible material.

* * * * *